United States Patent
Rousseaux et al.

(10) Patent No.: US 9,384,871 B2
(45) Date of Patent: Jul. 5, 2016

(54) POLYMER COMPOSITION COMPRISING CARBON NANOTUBES

(71) Applicant: TOTAL RESEARCH & TECHNOLOGY FELUY, Seneffe (BE)

(72) Inventors: Dimitri Rousseaux, Nivelles (BE); Michel Duc, Pau (FR); Philippe Lodefier, Wemmel (BE); Olivier Lhost, Havre (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

(21) Appl. No.: 14/372,675

(22) PCT Filed: Jan. 18, 2013

(86) PCT No.: PCT/EP2013/050963
§ 371 (c)(1),
(2) Date: Jul. 16, 2014

(87) PCT Pub. No.: WO2013/107875
PCT Pub. Date: Jul. 25, 2013

(65) Prior Publication Data
US 2014/0378578 A1 Dec. 25, 2014

(30) Foreign Application Priority Data

Jan. 20, 2012 (EP) .................................. 12151931
Nov. 13, 2012 (WO) ................. PCT/EP2012/072471

(51) Int. Cl.
*C08K 3/04* (2006.01)
*H01B 1/24* (2006.01)
*C08J 3/22* (2006.01)
*C08L 25/06* (2006.01)
*H01B 3/44* (2006.01)
*C08K 7/24* (2006.01)

(52) U.S. Cl.
CPC ... *H01B 1/24* (2013.01); *C08J 3/22* (2013.01); *C08K 3/04* (2013.01); *C08L 25/06* (2013.01); *H01B 3/441* (2013.01); *H01B 3/442* (2013.01); *C08K 7/24* (2013.01); *C08K 2201/011* (2013.01); *C08K 2201/019* (2013.01)

(58) Field of Classification Search
CPC ..................................... C08K 3/04; H01B 1/24
USPC .................. 523/351; 524/495, 496
See application file for complete search history.

(56) References Cited

U.S. PATENT DOCUMENTS

| 4,076,698 | A | 2/1978 | Anderson et al. |
|---|---|---|---|
| 4,128,607 | A | 12/1978 | Shiomura et al. |
| 4,354,009 | A | 10/1982 | Goeke et al. |
| 6,864,207 | B2 | 3/2005 | Knoeppel et al. |
| 6,930,071 | B2 | 8/2005 | Knoeppel et al. |
| 2008/0160290 | A1 | 7/2008 | Park et al. |
| 2010/0201023 | A1 | 8/2010 | Piccione et al. |
| 2010/0240832 | A1 | 9/2010 | Duc et al. |

FOREIGN PATENT DOCUMENTS

| CN | 101067031 A | 11/2007 |
|---|---|---|
| EP | 0004645 A2 | 10/1979 |
| EP | 2151830 A1 | 10/2010 |

OTHER PUBLICATIONS

Zhou Xiangwen; et al, "Polypropylene composites having carbon nanotubes and powder styrene-butadiene rubber"; Journal of Tsinghua University; Tsinghua University Press, China; vol. 48, No. 12; Dec. 1, 2008, pp. 2102-2105.
Al-Saleh; et al., "An innovative method to reduce percolation threshold of carbon black filled immiscible polymer blends"; Composites Part A: Applied Science and Manufacturing, vol. 39, No. 2; Oct. 30, 2007; pp. 284-293; Elsevier Science Publishers B.V., Amsterdam, NL.
Khare, et al., "Melt-mixed polypropylene/acrylonitrile-butadiene-styrene blends with multiwall carbon nanotubes: Effect of compatibilizer and modifier on morphology and electrical conductivity"; Journal of Applied Polymer Science, John Wiley & Sons, Inc, USA; vol. 120; No. 5.; Jan. 3, 2011; pp. 2663-2672.
Khare, et al., "Influence of multiwall carbon nanotubes on morphology and electrical conductivity of PP/ABS blends", Journal of Polymer Science Part B: Polymer Physics, vol. 46, No. 21, pp. 2286-2295; Nov. 2008, John Wiley & Sons, Inc, US.
D. Rosato, "Rosato's Plastics Encyclopedia and Dictionary"; 1997; Hanser Publishers, Munich Vienna, pp. 6-7.
International Search Report issued in International Application No. PCT/EP2013/050963, dated Mar. 20, 2013 (5 pages).
Plastics Additives Handbook, ed. H. Zweifel, 5th edition, 2005, Hanser Publishers.
Chinese Office Action issued in Chinese Application No. 201380011249.6, dated Jun. 2, 2015 (16 pages).

*Primary Examiner* — Edward Cain
(74) *Attorney, Agent, or Firm* — Albert Shung

(57) ABSTRACT

A composition can include polystyrene, modified-polystyrene, or a mixture thereof. The polystyrene, modified-polystyrene, or mixture thereof can include carbon nanotubes. The composition can also include a polyolefin. The composition can include at most 1.90% by weight of carbon nanotubes, based on a total weight of the composition. The composition can be made by melt blending the polystyrene, modified-polystyrene, or a mixture thereof with carbon nanotubes, and with the polyolefin. An article can be made from the composition.

24 Claims, No Drawings

US 9,384,871 B2

POLYMER COMPOSITION COMPRISING CARBON NANOTUBES

CROSS REFERENCE TO RELATED APPLICATIONS

This application claims the benefit of PCT/EP2013/050963, filed on Jan. 18, 2013, which claims priority from European Application No. 12151931.8, filed on Jan. 20, 2012, and PCT/EP2012/072471, filed on Nov. 13, 2012.

FIELD OF THE INVENTION

The present invention relates to a polymer composition comprising carbon nanotubes. In particular, the present invention relates to conductive polymer compositions comprising carbon nanotubes. The present invention also relates to a process for the preparation of said compositions.

BACKGROUND OF THE INVENTION

As electronic devices become smaller and faster, their sensitivity to electrostatic charges is increased and electronic packaging has been provided to improve electrostatically dissipative properties. Electronics packaging is designed to prevent the build-up of static electrical charges and the consecutive electrostatic discharge (ESD) which can be responsible of serious damages to sensitive electronics and result in product defects and high scrap rates.

In order to ensure ESD protection, inherently electrically insulating polymers may be rendered conductive or dissipative by incorporating conductive fillers (such as carbon black, CB) allowing effective dissipation of static electrical charges.

Currently conductive or dissipative plastics are dominated by CB, mainly because CB is relatively cheap in comparison to other conductive fillers, such as carbon fiber, carbon nanotubes (CNT), metal fiber, metal-coated carbon fiber, and metal powder. Addition level of CB must be sufficient so that particles create a conductive pathway through the materials. In consequence, high levels of CB (15-30%) are required to meet the requirements, which alter critical physical properties of the basic polymer such as impact strength, elongation and compound viscosity.

These properties need to be preserved when using other fillers instead of CB as conductive fillers. Nevertheless, a minimum concentration is required to obtain the desired conductivity. Since other fillers are more expensive than CB, there remains a need to provide improved conductive compositions which are electrically insulating.

SUMMARY OF THE INVENTION

It is therefore an object of the present invention to provide a conductive composition which is electrically insulating. According to a first aspect, the invention provides a composition comprising: polystyrene or modified-polystyrene or a mixture thereof, said polystyrene or modified-polystyrene or mixture thereof further comprising carbon nanotubes; wherein the composition further comprises a polyolefin; and wherein the composition comprises at most 1.90% by weight of carbon nanotubes, based on the total weight of the composition.

According to a second aspect, the invention provides a process for preparing the composition according to the first aspect of the invention, comprising the step of melt blending polystyrene or modified-polystyrene or mixture thereof, with carbon nanotubes, and with the polyolefin.

The independent and dependent claims set out particular and preferred features of the invention. Features from the dependent claims may be combined with features of the independent or other dependent claims as appropriate.

DETAILED DESCRIPTION OF THE INVENTION

Before the present compositions and processes of the invention are described, it is to be understood that this invention is not limited to particular compositions described, since such compositions may, of course, vary. It is also to be understood that the terminology used herein is not intended to be limiting, since the scope of the present invention will be limited only by the appended claims.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

As used herein, the singular forms "a", "an", and "the" include both singular and plural referents unless the context clearly dictates otherwise. By way of example, "a polystyrene" means one polystyrene or more than one polystyrene.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised" of as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

The present invention provides a conductive composition comprising a polystyrene or modified-polystyrene or mixture thereof, wherein the composition further comprises a polyolefin; and wherein the composition further comprises at most 1.90% by weight of carbon nanotubes, based on the total weight of the composition.

In an embodiment, the composition comprises the melt blending product of said polystyrene or modified-polystyrene or mixture thereof, said polyolefin and said carbon nanotubes.

As used herein, the term "melt blending" involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing. Melt blending may be conducted in machines such as, single or multiple screw extruders, Buss kneader, Eirich mixers, Henschel, helicones, Ross mixer, Banbury, roll mills, molding machines such as injection molding machines, vacuum forming machines, blow molding machines, or the like, or combinations comprising at least one of the foregoing machines. It is generally desirable during melt or solution blending of the composition to impart a specific energy of about 0.01 to about 10 kilowatt-hour/kilogram (kwhr/kg) of the composition. In a preferred embodiment, melt blending is performed in a twin screw extruder, such as a Brabender co-rotating twin screw extruder.

Preferably, the composition comprises at least two immiscible phases: a polystyrene phase and a polyolefin phase. The carbon nanotubes are preferably in the polystyrene phase.

In an embodiment, the composition comprises a polystyrene phase comprising the polystyrene or modified-polystyrene or mixture thereof, and a polyolefin phase comprising polyolefin, wherein the carbon nanotubes are in the polystyrene phase.

Preferably, the composition comprises in said polystyrene phase at least 50% by weight of carbon nanotubes, based on the total weight of the carbon nanotubes. This embodiment means that at least 50% by weight of carbon nanotubes are in the polystyrene phase. More preferably, the composition comprises in said polystyrene phase at least 60% by weight of carbon nanotubes, preferably at least 70% by weight of carbon nanotubes, preferably at least 80% by weight, based on the total weight of the carbon nanotubes. The percentage of carbon nanotubes in the polystyrene phase can be measured by selective dissolution and extraction of the polystyrene phase in xylene at ambient temperature and the subsequent determination of the nanotubes concentrations in said phase as described below.

In some embodiments, the composition can comprise at least 30% by weight of the polystyrene or modified-polystyrene or mixture thereof, based on the total weight of the composition. Preferably, the composition comprises at least 35% by weight, for example at least 40% by weight, for example at least 45% by weight, more preferably at least 50% by weight of the polystyrene or modified-polystyrene or mixture thereof, yet more preferably at least 54% by weight of the polystyrene or modified-polystyrene or mixture thereof, based on the total weight of the composition.

Non-limiting examples of suitable polystyrenes which can be used in the composition comprise polystyrene, modified polystyrene, or mixtures of polystyrene and modified polystyrene.

In the modified-polystyrene, part of the styrene may be replaced by unsaturated monomers copolymerizable with styrene, for example alpha-methylstyrene or (meth)acrylates, Other examples which may be mentioned are chloropolystyrene, poly-alpha-methylstyrene, styrene-chlorostyrene copolymers, styrene-propylene copolymers, styrenebutadiene copolymers, styrene-isoprene copolymers, styrene-vinyl chloride copolymers, styrene-vinyl acetate copolymers, styrene-alkyl acrylate copolymers (methyl, ethyl, butyl, octyl, phenyl acrylate), styrene-alkyl methacrylate copolymers (methyl, ethyl, butyl, phenyl methacrylate), styrene methyl chloroacrylate copolymers and styrene-acrylonitrile-alkyl acrylate copolymers.

The polystyrenes for use in the present invention may be co- or homopolymers of styrene, alpha methyl styrene and para methyl styrene. Preferably the polystyrene is homopolystyrene.

The polystyrenes may be prepared by a number of methods. This process is well known to those skilled in the art and described for example in the above mentioned reference.

The modified-polystyrene for use in the composition may be rubber modified.

The rubber may be prepared by a number of methods, preferably by emulsion or solution polymerization. These processes are well known to those skilled in the art.

If present, preferably the rubber is present in an amount from about 3 to 15% by weight. Polybutadiene is a particularly useful rubber.

Preferably the modified-polystyrene is rubber modified polystyrene.

In an embodiment, the rubber modified polystyrene is a High Impact Polystyrene (HIPS). The process for making HIPS is well known to those skilled in the art. For example, the process may comprise polymerizing styrene monomer in the presence of dissolved rubber. Polymerization of styrene, and optionally a comonomer, may be initiated by heating and/or by an initiator, by way of example a radical initiator. The rubber may be "dissolved" in the styrene monomer. The usual rubber types utilized in the manufacture of HIPS include polybutadiene (PB), styrene-butadiene rubber (SBR), and styrene-butadiene-styrene rubber (SBS). Polystyrene may be initially formed from the styrene monomer within the homogeneous rubber solution in styrene. In HIPS, a part of the styrene may be replaced by unsaturated monomers copolymerizable with styrene such as other monovinylaromatic monomers, alkyl esters of acrylic or methacrylic acid and acrylonitrile. Non-limiting examples of suitable processes for preparing HIPS are described in US2010/240832, incorporated herein by reference.

Advantageously, the modified-polystyrene is a HIPS or a mixture of polystyrene and HIPS.

In an embodiment, the composition comprises at least 30% by weight HIPS or a mixture of polystyrene and HIPS, based on the total weight of the composition. For example, the composition comprises at least 35%, at least 40%, at least 45%, at least 50% by weight of HIPS or a mixture of HIPS and polystyrene, based on the total weight of the composition.

The composition also comprises at least one polyolefin. As used herein, the terms "olefin polymer" and "polyolefin" are used interchangeably.

In an embodiment, the composition comprises at most 70%, for example at most 60%, by weight of polyolefin based on the total weight of the composition. For example, the composition comprises at least 15% by weight, for example at least 20%, for example at least 25%, for example at least 30% of polyolefin based on the total weight of the composition, preferably at least 35% of polyolefin based on the total weight of the composition, preferably at least 40% of polyolefin based on the total weight of the composition.

Suitable polyolefins used in the present invention may be any olefin homopolymer or any copolymer of an olefin and one or more comonomers. As used herein, the term "homopolymer" refers to a polymer which is made by linking (preferably olefin, preferably ethylene) monomers, in the absence of comonomers. As used herein, the term "co-polymer" refers to a polymer, which is made by linking two different types of monomers in the same polymer chain. The polyolefins may be atactic, syndiotactic or isotactic. The olefin can be mono-olefin, of di-olefin. The mono-olefin can for example be ethylene, propylene, 1-butene, 1-pentene, 1-hexene, 4-methyl-1-pentene or 1-octene, but also cycloolefins such as for example cyclopentene, cyclohexene, cyclooctene or norbornene. Preferably the olefin is alpha-olefin. The di-olefin can for example also be butadiene (such as 1,3-butadiene), 1,2-propadiene, 2-methyl-1,3-butadiene, 1,5-cyclooctadiene, norbornadiene, dicyclopentadiene, 1,3-heptadiene, 2,3-dimethylbutadiene, 2-ethyl-1,3-pentadiene, 1,3-hexadiene or 2,4-hexadiene.

The comonomer if present is different from the olefin and chosen such that it is suited for copolymerization with the olefin. The comonomer may also be an olefin as defined above.

Comonomers may comprise but are not limited to aliphatic $C_2$-$C_{20}$ alpha-olefins. Examples of suitable aliphatic $C_2$-$C_{20}$ alpha-olefins include ethylene, propylene, 1-butene, 4-methyl-1-pentene, 1-hexene, 1-octene, 1-decene, 1-dodecene, 1-tetradecene, 1-hexadecene, 1-octadecene and 1-eicosene. Further examples of suitable comonomers are vinyl acetate ($H_3C$—$C(\!\!=\!\!O)O$—$CH\!\!=\!\!CH_2$) or vinyl alcohol ("HO—$CH\!\!=\!\!CH_2$", which as such is not stable and tends to polymerize). Examples of olefin copolymers suited for use in the present composition are random copolymers of propylene and ethylene, random copolymers of propylene and 1-butene, heterophasic copolymers of propylene and ethylene, ethylene-butene copolymers, ethylene-hexene copolymers, ethylene-octene copolymers, copolymers of ethylene and vinyl acetate (EVA), copolymers of ethylene and vinyl alcohol (EVOH).

The amount of comonomer can be from 0 to 12% by weight, based on the weight of the polyolefin, more preferably it can be from 0 to 9% by weight and most preferably it can be from 0 to 7% by weight. A copolymer can be a random or block (heterophasic) copolymer. Preferably, the copolymer is a random copolymer.

Preferred polyolefins for use in the present composition are olefin homopolymers and copolymers of an olefin and optionally one or more comonomers. In a preferred embodiment, the polyolefin is a homopolymer or a copolymer of ethylene, or propylene. In an embodiment, the polyolefin is selected from the group comprising polyethylene, polypropylene or a combination thereof. Preferably, the polyolefin is selected from polyethylene and polypropylene homo- and copolymers. Preferably, the polyolefin is polyethylene or polypropylene, or a copolymer thereof.

In a preferred embodiment, the polyolefin is selected from the group comprising linear low density polyolefin, low density polyolefin, and high density polyolefin.

In an embodiment, the polyolefin has a density of 0.890 to 0.975 g/cm$^3$, preferably of from 0.890 to 0.960 g/cm$^3$, preferably of from 0.890 to 0.930 g/cm$^3$, preferably of from 0.890 to 0.925 g/cm$^3$, preferably of from 0.890 to 0.920 g/cm$^3$ with the density being determined with the ASTM D-1505 standardized test at a temperature of 23° C.

Preferably the polyolefin is a linear low density polyolefin. Preferably, the polyolefin is selected from the group comprising linear low density polyethylene (LLDPE), low density polyethylene (LDPE), and high density polyethylene (HDPE). Suitable Linear low density polyethylene (LLDPE) and low density polyethylene (LDPE) has a density below 0.930 g/cm$^3$ with the density being determined with the ASTM D-1505 standardized test at a temperature of 23° C. Suitable high density polyethylene (HDPE) has a density ranging from 0.940 to 0.975 g/cm$^3$, with the density being determined with the ASTM D-1505 standardized test at a temperature of 23° C. Preferably the polyolefin is linear low density polyethylene (LLDPE).

Suitable linear low density polyethylenes are available commercially, e.g. from Total Petrochemicals, from Exxon under the tradename Escorene or from Dow Chemicals under the tradename DOWLEX. Alternatively, they may readily be prepared by state of the art polymerization processes such as those described in U.S. Pat. No. 4,354,009, U.S. Pat. No. 4,076,698, European Patent Application 4645 (published 10-17-79), and U.S. Pat. No. 4,128,607. Suitable linear low density polyethylene polymers can be co-polymers of ethylene and a minor amount, for example less than 20 mole %, preferably less than 15 mole %, of an alpha olefin of 3 to 18 carbon atoms, preferably 3 to 10 carbon atoms, most preferably 4 to 8 carbon atoms.

Preferred linear low density polyethylene co-polymers can be prepared from ethylene and one or more alpha olefins selected from the group consisting of propylene, 1-butene, 1-pentene, 4-methyl-1-pentene, 1-hexene and 1-octene, most preferably 1-butene. Polymers of desired density may be obtained by controlling the co-polymerization ratio of alpha olefin and the formation proportion of the polymer during co-polymerization. The addition of increasing amounts of the co-monomers to the co-polymers results in lowering the density of the co-polymer.

The polyolefin, such as polyethylene, can be prepared as know in the art, in the presence of any catalyst known in the art. As used herein, the term "catalyst" refers to a substance that causes a change in the rate of a polymerization reaction without itself being consumed in the reaction. In the present invention, it is especially applicable to catalysts suitable for the polymerization of ethylene to polyethylene. These catalysts will be referred to as ethylene polymerization catalysts or polymerization catalysts. In an embodiment of the invention, the polymer composition comprises a polyolefin prepared in the presence of a catalyst selected from a Ziegler-Natta catalyst, a metallocene catalyst or a chromium catalyst. In a preferred embodiment of the invention, the polymer composition comprises a polyolefin prepared in the presence of a catalyst selected from a Ziegler-Natta catalyst, a metallocene catalyst, or both; preferably prepared in the presence of a metallocene catalyst.

The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

The term "Ziegler-Natta catalyst" or "ZN catalyst" refers to catalysts having a general formula $M^1X_v$, wherein $M^1$ is a transition metal compound selected from group IV to VII from the periodic table of elements, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$ and $TiCl_4$. Suitable ZN catalysts for use in the invention are described in U.S. Pat. No. 6,930,071 and U.S. Pat. No. 6,864,207, which are incorporated herein by reference.

The term "metallocene catalyst" is used herein to describe any transition metal complexes consisting of metal atoms bonded to one or more ligands. The metallocene catalysts are compounds of Group 4 transition metals of the Periodic Table such as titanium, zirconium, hafnium, etc., and have a coordinated structure with a metal compound and ligands composed of one or two groups of cyclo-pentadienyl, indenyl, fluorenyl or their derivatives. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In an embodiment, the metallocene catalyst has a general formula (I) or (II):

$$(Ar)_2MQ_2 \quad (I); \text{ or}$$

$$R^1(Ar)_2MQ_2 \quad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a $SiR^2_3$ group wherein $R^2$ is a hydrocarbyl having 1 to 20 carbon atoms, and a hydrocarbyl having 1 to 20 carbon atoms, wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein $R^1$ is a divalent group or moiety bridging the two Ar groups and selected from the group consisting of a $C_1$-$C_{20}$ alkylene, a germanium, a silicon, a siloxane, an alkylphosphine and an amine, and wherein said $R^1$ is optionally substituted with one or more substituents each independently selected from the group consisting of halogen, a hydrosilyl, a $SiR^3_3$ group wherein $R^3$ is a hydrocarbyl having 1 to 20 carbon atoms, and a hydrocarbyl having 1 to 20 carbon atoms, wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

As used herein, the term "alkyl" by itself or as part of another substituent, refers to a straight or branched saturated hydrocarbon radical group joined by single carbon-carbon bonds having 1 or more carbon atoms, for example 1 to 20 carbon atoms, for example 1 to 12 carbon atoms, for example 1 to 6 carbon atoms, for example 1 to 4 carbon atoms, for example 2 to 3 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of $C_{1-12}$alkyl groups are methyl, ethyl, propyl, isopropyl, butyl, isobutyl, sec-butyl, tert-butyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers.

As used herein, the term "$C_{3-20}$cycloalkyl", by itself or as part of another substituent, refers to a saturated or partially saturated cyclic alkyl radical containing from 3 to 20 carbon atoms. Examples of $C_{3-20}$cycloalkyl include cyclopropyl, cyclobutyl, cyclopentyl, cyclohexyl, cycloheptyl and cyclooctyl.

As used herein, the term "$C_{6-20}$aryl", by itself or as part of another substituent, refers to a polyunsaturated, aromatic hydrocarbyl group having a single ring (i.e. phenyl) or multiple aromatic rings fused together (e.g. naphthalene), or linked covalently, typically containing 6 to 20 carbon atoms; wherein at least one ring is aromatic. Examples of $C_{6-20}$aryl include phenyl, naphthyl, indanyl, biphenyl, or 1,2,3,4-tetrahydro-naphthyl.

The term "arylalkyl", as a group or part of a group, refers to an alkyl as defined herein, wherein one or more hydrogen atoms are replaced by an aryl as defined herein. Examples of arylalkyl radicals include benzyl, phenethyl, dibenzylmethyl, methylphenylmethyl, 3-(2-naphthyl)-butyl, and the like.

As used herein, the term "alkylaryl", by itself or as part of another substituent, refers to an aryl group as defined herein, wherein one or more hydrogen atoms are replaced by an alkyl as defined herein.

The term "hydrocarboxy having 1 to 20 carbon atoms" refers to a radical having the formula —O—R, wherein $R_a$ is hydrocarbyl having 1 to 20 carbon atoms. Preferred hydrocarboxy groups are alkoxy groups. The term "alkoxy" or "alkyloxy" as used herein refers to a radical having the formula —O—$R_b$ wherein $R_b$ is alkyl. Non-limiting examples of suitable alkoxy groups include methoxy, ethoxy, propoxy, isopropoxy, butoxy, isobutoxy, sec-butoxy, tert-butoxy, pentyloxy, amyloxy, hexyloxy, heptyloxy and octyloxy. Preferred hydrocarboxy groups are methoxy, ethoxy, propoxy, butoxy, and amyloxy.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis (indenyl) zirconium dichloride, and bis(n-butyl-cyclopentadienyl) zirconium dichloride, ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene[1-(4-tert-butyl-2-methyl-cyclopentadienyl)](fluoren-9-yl) zirconium dichloride.

The metallocene catalysts can be provided on a solid support. The support can be an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support.

Preferably, the metallocene catalyst is activated with a cocatalyst. The cocatalyst, which activates the metallocene catalyst component, can be any cocatalyst known for this purpose such as an aluminum-containing cocatalyst, a boron-containing cocatalyst or a fluorinated catalyst. The aluminum-containing cocatalyst may comprise an alumoxane, an alkyl aluminum, a Lewis acid and/or a fluorinated catalytic support.

In an embodiment, alumoxane is used as an activating agent for the metallocene catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the metallocene catalyst. In an embodiment, alumoxanes comprise oligomeric linear and/or cyclic alkyl alumoxanes. In a further embodiment, the alumoxane has formula (III) or (IV)

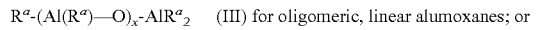   (III) for oligomeric, linear alumoxanes; or

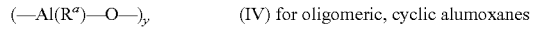   (IV) for oligomeric, cyclic alumoxanes wherein x is 1-40, and preferably 10-20;
wherein y is 3-40, and preferably 3-20; and
wherein each $R^a$ is independently selected from a $C_1$-$C_8$ alkyl, and preferably is methyl.

In a preferred embodiment, the alumoxane is methylalumoxane (MAO).

In an embodiment, the catalyst used for preparing the polyolefin is a supported metallocene-alumoxane catalyst comprising a metallocene and an alumoxane which are bound on a porous silica support.

In an embodiment, the composition can comprise at most 1.90% by weight of carbon nanotubes (CNT), based on the total weight of the composition.

Suitable carbon nanotubes used in the present invention can generally be characterized by having a size from 1 nm to 500 nm, this definition of size can be limited to two dimensions only, i.e. the third dimension may be outside of these limits.

Suitable carbon nanotubes also referred to as "nanotubes" herein, can be cylindrical in shape and structurally related to fullerenes, an example of which is Buckminster fullerene ($C_{60}$). Suitable carbon nanotubes may be open or capped at their ends. The end cap may for example be a Buckminster-type fullerene hemisphere. Suitable carbon nanotubes used in the present invention can comprise more than 90%, more preferably more than 95%, even more preferably more than 99% and most preferably more than 99.9% of their total weight in carbon. However, minor amounts of other atoms may also be present.

Suitable carbon nanotubes to be used in the present invention can be prepared by any method known in the art. They can be prepared by the catalyst decomposition of hydrocarbons, a technique that is called Catalytic Carbon Vapor Deposition (CCVD). Other methods for preparing carbon nanotubes include the arc-discharge method, the plasma decomposition of hydrocarbons or the pyrolysis of selected polyolefin under selected oxidative conditions. The starting hydrocarbons can be acetylene, ethylene, butane, propane, ethane, methane or any other gaseous or volatile carbon-containing compound. The catalyst, if present, is used in either pure or in supported form. The presence of a support greatly improves the selectivity of the catalysts but it contaminates the carbon nanotubes with support particles, in addition to the soot and amorphous carbon prepared during pyrolysis.

Purification can remove these by-products and impurities. This can be carried out according to the following two steps:
1) the dissolution of the support particles, typically carried out with an appropriate agent that depends upon the nature of the support and
2) the removal of the pyrolytic carbon component, typically based on either oxidation or reduction processes.

Nanotubes can exist as single-walled nanotubes (SWNT) and multi-walled nanotubes (MWNT), i.e. nanotubes having one single wall and nanotubes having more than one wall, respectively. In single-walled nanotubes a one atom thick sheet of atoms, for example a one atom thick sheet of graphite (also called graphene), is rolled seamlessly to form a cylinder. Multi-walled nanotubes consist of a number of such cylinders arranged concentrically. The arrangement in a multi-walled nanotube can be described by the so-called Russian doll model, wherein a larger doll opens to reveal a smaller doll.

In an embodiment, the nanotubes are multi-walled carbon nanotubes, more preferably multi-walled carbon nanotubes having on average from 5 to 15 walls.

Nanotubes, irrespectively of whether they are single-walled or multi-walled, may be characterized by their outer diameter or by their length or by both.

Single-walled nanotubes are preferably characterized by an outer diameter of at least 0.5 nm, more preferably of at least 1 nm, and most preferably of at least 2 nm. Preferably their outer diameter is at most 50 nm, more preferably at most 30 nm and most preferably at most 10 nm. Preferably, the length of single-walled nanotubes is at least 0.1 μm, more preferably at least 1 μm, even more preferably at least 10 μm. Preferably, their length is at most 50 mm, more preferably at most 25 mm.

Multi-walled nanotubes are preferably characterized by an outer diameter of at least 1 nm, more preferably of at least 2 nm, 4 nm, 6 nm or 8 nm, and most preferably of at least 10 nm. The preferred outer diameter is at most 100 nm, more preferably at most 80 nm, 60 nm or 40 nm, and most preferably at most 20 nm. Most preferably, the outer diameter is in the range from 10 nm to 20 nm. The preferred length of the multi-walled nanotubes is at least 50 nm, more preferably at least 75 nm, and most preferably at least 100 nm. Their preferred length is at most 20 mm, more preferably at most 10 mm, 500 μm, 250 μm, 100 μm, 75 μm, 50 μm, 40 μm, 30 μm or 20 μm, and most preferably at most 10 μm. The most preferred length is in the range from 100 nm to 10 μm. In an embodiment, the multi-walled carbon nanotubes have an average outer diameter in the range from 10 nm to 20 nm or an average length in the range from 100 nm to 10 μm or both.

Preferred carbon nanotubes are carbon nanotubes having a surface area of 200-400 $m^2$/g (measured by BET method).

Preferred carbon nanotubes are carbon nanotubes having a mean number of 5-15 walls.

Non-limiting examples of commercially available multi-walled carbon nanotubes are Graphistrength™ 100, available from Arkema, Nanocyl™ NC 7000 available from Nanocyl, FloTube™ 9000 available from CNano Technology, Baytubes® C 150 B available from Bayer Material Science.

In preferred embodiments, said carbon nanotubes are provided as a polystyrene or modified-polystyrene masterbatch. As used herein, the term "masterbatch" refers to concentrates of active material (such as the carbon nanotubes) in a polymer, which are intended to be subsequently incorporated into another polymer (compatible or non-compatible with the polymer already contained in these masterbatches). Use of carbon nanotubes containing masterbatches makes processes more easily adaptable to industrial scale, compared to direct incorporation of carbon nanotubes powder.

In an embodiment, the composition according to the invention comprises at least 0.10% by weight of carbon nanotubes, relative to the total weight of the composition. For example, the composition of the present invention can comprise at least 0.30% by weight of carbon nanotubes, for example at least 0.40% by weight, for example at least 0.45% by weight of carbon nanotubes, relative to the total weight of the composition, preferably at least 0.50% by weight, preferably at least 0.55% by weight, more preferably at least 0.60% by weight, more preferably at least 0.65% by weight, most preferably at least 0.68% by weight, relative to the total weight of the composition.

In an embodiment, the composition comprises at most 1.75% by weight, for example at most 1.50% by weight, for example at most 1.25% by weight, for example at most 1.00% by weight, for example at most 0.95%, for example at most 0.90% by weight of carbon nanotubes, based on the total weight of the composition.

In an embodiment, the composition comprises:
at least 40% by weight of polystyrene or modified-polystyrene, or a mixture thereof, based on the total weight of the composition, preferably at least 45% by weight of polystyrene or modified-polystyrene, or a mixture thereof; preferably of high impact polystyrene or a mixture of high impact polystyrene and polystyrene;
at least 15% by weight of polyolefin, based on the total weight of the composition, preferably at least 20% by weight of polyolefin, preferably at least 25% by weight of polyolefin, preferably at least 30% by weight of polyolefin, preferably at least 40% by weight of polyolefin, preferably of polyethylene or polypropylene; and
at most 1.90% by weight of carbon nanotubes, preferably at most 1.75% by weight of carbon nanotubes, preferably at most 1.50% by weight of carbon nanotubes, preferably at most 1.25% by weight of carbon nanotubes, preferably at most 1.00%, for example at most 0.95%, for example at most 0.90%, by weight of carbon nanotubes based on the total weight of the composition.

In an embodiment, the composition comprises:
at least 40% by weight of polystyrene or modified-polystyrene, or a mixture thereof, based on the total weight of the composition, preferably at least 45% by weight of polystyrene or modified-polystyrene, or a mixture thereof; preferably of high impact polystyrene or a mixture of high impact polystyrene and polystyrene;
at most 60% by weight of polyolefin, preferably at most 55% by weight of polyolefin, and at least 15% by weight of polyolefin, preferably at least 20% by weight of polyolefin, preferably at least 25% by weight of polyolefin, preferably at least 30% by weight of polyolefin, preferably at least 40% by weight of polyolefin, based on the total weight of the composition; preferably of polyethylene or polypropylene; and
at least 0.10% by weight of carbon nanotubes, preferably at least 0.30% by weight of carbon nanotubes, preferably at least 0.40% by weight of carbon nanotubes, preferably at least 0.50% by weight, preferably at least 0.55% by weight, more preferably at least 0.60% by weight, more preferably at least 0.65% by weight, most preferably at least 0.68% by weight, and at most 1.90% by weight of carbon nanotubes, preferably at most 1.75% by weight of carbon nanotubes, preferably at most 1.50% by weight of carbon nanotubes, preferably at most 1.25% by weight of carbon nanotubes, preferably at most 1.00% by weight, for example at most 0.95% by weight, for example at most 0.90% by weight, of carbon nanotubes based on the total weight of the composition.

In an embodiment, the composition comprises a polystyrene phase comprising the polystyrene or modified-polystyrene (or a mixture thereof), and a polyolefin phase comprising said polyolefin, wherein the carbon nanotubes are located in the polystyrene phase.

In an embodiment, the composition comprises a polystyrene phase comprising HIPS or a mixture of HIPS and polystyrene, and a polyolefin phase comprising said at least one polyolefin, wherein the carbon nanotubes are in the polystyrene phase.

Preferably, the concentration of carbon nanotubes in the polystyrene phase is higher than the concentration of carbon nanotubes in the total composition. In an embodiment, the composition comprises in said polystyrene phase at least 40% by weight of carbon nanotubes, based on the total weight of the carbon nanotubes. In an embodiment, the composition comprises in said polystyrene phase at least 50% by weight, for example at least 60% by weight, for example at least 70% by weight, for example at least 80% by weight of carbon nanotubes, based on the total weight of the carbon nanotubes.

The composition can further comprise a styrenic copolymer, preferably wherein the styrenic copolymer is selected from styrene-butadiene-styrene block copolymer (SBS) or styrene-ethylene-butadiene-styrene block copolymer (SEBS).

Preferably, the styrenic copolymer is a styrenic block copolymer. Suitable styrenic block copolymers include at least two monoalkenyl arene blocks, preferably two polystyrene blocks, separated by a block of a saturated conjugated diene, such as a saturated polybutadiene block. Suitable unsaturated block copolymers include, but are not limited to, those represented by the following formulas: A-B-R(-B-A)$_n$ or A$_x$-(BA-)$_y$-BA wherein each A is a polymer block comprising a vinyl aromatic monomer, such as styrene, and each B is a polymer block comprising a conjugated diene, such as isoprene or butadiene, and optionally a vinyl aromatic monomer, such as styrene; R is the remnant of a multifunctional coupling agent (if R is present, the block copolymer can be a star or branched block copolymer); n is an integer from 1 to 5; x is zero or 1; and y is a real number from zero to 4.

In an embodiment of the invention, the composition comprises one or more additives selected from the group comprising an antioxidant, an antiacid, a UV-absorber, an antistatic agent, a light stabilizing agent, an acid scavenger, a lubricant, a nucleating/clarifying agent, a colorant or a peroxide. An overview of suitable additives may be found in Plastics Additives Handbook, ed. H. Zweifel, 5$^{th}$ edition, 2001, Hanser Publishers, which is hereby incorporated by reference in its entirety.

In an embodiment, the composition is free from any compatibilizers.

The invention also encompasses the composition as described herein wherein the composition comprises from 0% to 10% by weight of at least one additive such as antioxidant, based on the total weight of the composition. In a preferred embodiment, said composition comprises less than 5% by weight of additive, based on the total weight of the composition, for example from 0.1 to 3% by weight of additive, based on the total weight of the composition.

In an embodiment, the composition comprises an antioxidant. Suitable antioxidants include, for example, phenolic antioxidants such as pentaerythritol tetrakis[3-(3',5'-di-tert-butyl-4'-hydroxyphenyl)propionate] (herein referred to as Irganox 1010), tris(2,4-ditert-butylphenyl) phosphite (herein referred to as Irgafos 168), 3DL-alpha-tocopherol, 2,6-di-tert-butyl-4-methylphenol, dibutylhydroxyphenylpropionic acid stearyl ester, 3,5-di-tert-butyl-4-hydroxyhydrocinnamic acid, 2,2'-methylenebis(6-tert-butyl-4-methyl-phenol), hexamethylene bis[3-(3,5-di-tert-butyl-4-hydroxyphenyl)propionate], benzenepropanamide,N,N'-1,6-hexanediyl bis[3,5-bis(1,1-dimethylethyl)-4-hydroxy] (Antioxidant 1098), Diethyl 3,5-Di-Tert-Butyl-4-Hydroxybenzyl Phosphonate, Calcium bis[monoethyl(3,5-di-tert-butyl-4-hydroxylbenzyl) phosphonate], Triethylene glycol bis(3-tert-butyl-4-hydroxy-5-methylphenyl)propionate (Antioxidant 245), 6,6'-di-tert-butyl-4,4'-butylidenedi-m-cresol, 3,9-bis(2-(3-(3-tert-butyl-4-hydroxy-5-methylphenyl)propionyloxy-1,1-dimethylethyl)-2,4,8,10-tetraoxaspiro[5.5]undecane, 1,3,5-trimethyl-2,4,6-tris(3,5-di-tert-butyl-4-hydroxybenzyl) benzene, 1,1,3-tris(2-methyl-4-hydroxy-5-tert-butylphenyl) butane, (2,4,6-trioxo-1,3,5-triazine-1,3,5(2H,4H,6H)-triyl) triethylene tris[3-(3,5-di-tert-butyl-4-hydroxyphenyl) propionate], tris(3,5-di-tert-butyl-4-hydroxybenzyl) isocyanurate, Tris(4-tert-butyl-3-hydroxy-2,6-dimethylbenzyl) isocyanurate, ethylene bis[3,3-bis(3-tert-butyl-4-hydroxyphenyl)butyrate], and 2,6-bis[[3-(1,1-dimethylethyl)-2-hydroxy-5-methylphenyl]octahydro-4,7-methano-1H-indenyl]-4-methyl-phenol. Suitable antioxidants also include, for example, phenolic antioxidants with dual functionality such 4,4'-Thio-bis(6-tert-butyl-m-methyl phenol) (Antioxidant 300), 2,2'-Sulfanediylbis(6-tert-butyl-4-methylphenol) (Antioxidant 2246-S), 2-Methyl-4,6-bis(octylsulfanylmethyl)phenol, thiodiethylene bis[3-(3,5-di-tert-butyl-4-hydroxyphenyl)propionate], 2,6-di-tert-butyl-4-(4,6-bis (octylthio)-1,3,5-triazin-2-ylamino)phenol, N-(4-hydroxyphenyl)stearamide, bis(1,2,2,6,6-pentamethyl-4-piperidyl) [[3,5-bis(1,1-dimethylethyl)-4-hydroxyphenyl] methyl]butylmalonate, 2,4-di-tert-butylphenyl 3,5-di-tert-butyl-4-hydroxybenzoate, hexadecyl 3,5-di-tert-butyl-4-hydroxy-benzoate, 2-(1,1-dimethylethyl)-6-[[3-(1,1-dimethylethyl)-2-hydroxy-5-methylphenyl]methyl]-4-methylphenyl acrylate, and Cas nr. 128961-68-2 (Sumilizer GS). Suitable antioxidants also include, for example, aminic antioxidants such as N-phenyl-2-naphthylamine, poly(1,2-dihydro-2,2,4-trimethyl-quinoline), N-isopropyl-N'-phenyl-p-phenylenediamine, N-Phenyl-1-naphthylamine, CAS nr. 68411-46-1 (Antioxidant 5057), and 4,4-bis(alpha,alpha-dimethylbenzyl)diphenylamine (Antioxidant KY 405). Preferably, the antioxidant is selected from pentaerythritol tetrakis[3-(3',5'-di-tert-butyl-4'-hydroxyphenyl)propionate] (herein referred to as Irganox 1010), tris(2,4-ditert-butylphenyl) phosphite (herein referred to as Irgafos 168), or a mixture thereof.

The composition according to the invention may have improved conductive-dissipative conductivity. The target resistivity may depend on the particular application (ANSI-ESD F 541-2008). Preferably, the surface resistivity is at most $10^{11}\Omega$, preferably at most $10^{8}\Omega$, preferably at most $10^{6}\Omega$, for example at most $10^{5}\Omega$, for example at most $10^{4}\Omega$, for example at most $10^{3}\Omega$. The resistivity can be measured using the method described in ASTM-D257, or as described herein after in the example section.

In an embodiment, the composition comprises at most 1.90% by weight of carbon nanotubes, preferably at most 1.75% by weight of carbon nanotubes, preferably at most 1.50% by weight of carbon nanotubes, preferably at most 1.25% by weight of carbon nanotubes, preferably at most 1.00%, for example at most 0.95%, for example at most 0.90%, by weight of carbon nanotubes based on the total weight of the composition; and a surface resistivity of at most $10^{11}$ ohm, preferably at most $10^{8}$ ohm, preferably at most $10^{6}$ ohm, for example at most $10^{5}$ ohm, for example at most $10^{4}$ ohm, for example at most $10^{3}$ ohm.

The present invention also encompasses a process for preparing the composition according to the first aspect of the invention, the step of melt blending at least one polystyrene or modified-polystyrene or mixture thereof, carbon nanotubes, and at least one polyolefin.

Suitable polystyrene or modified-polystyrene, polyolefin and nanotubes can be as defined above.

In some embodiments, said carbon nanotubes are provided as a polystyrene masterbatch or modified polystyrene masterbatch, or a mixture thereof masterbatch.

As used herein, the term "masterbatch" refers to concentrates of active material (such as the carbon nanotubes (CNT)) in a polymer, which are intended to be subsequently incorporated into another polymer (compatible or non-compatible with the polymer already contained in these masterbatches). Use of masterbatches makes processes more easily adaptable to industrial scale, compared to direct incorporation of CNT powder. In an embodiment, the masterbatch comprises at least 5% by weight of carbon nanotubes based on the total weight of the masterbatch. Preferably the masterbatch comprises at least 8% by weight of carbon nanotubes based on the total weight of the masterbatch.

Preferably the masterbatch comprises at least 10% by weight of carbon nanotubes based on the total weight of the masterbatch.

To form a masterbatch, the CNT and polymer powders may be mixed in a mixer which is either integrated into the processing equipment, or positioned upstream of the latter.

In some embodiments, the polystyrene or modified-polystyrene or mixture thereof, the polyolefin and the carbon nanotubes are added simultaneously.

This mixing of powders, blends and masterbatch, may be carried out in conventional synthesis reactors, blade mixers, fluidized-bed reactors or in mixing equipment of the Brabender, Z-blade mixer or extruder type. According to one variant of the invention, it is thus possible to use a paddle or blade mixer.

In some embodiments, the process comprises the steps of:
(a) preparing a masterbatch blend comprising the polystyrene or modified-polystyrene or mixture thereof, and carbon nanotubes; and
(b) blending the blend of step (a) with at least one polyolefin, and with at least one polystyrene or modified-polystyrene or mixture thereof.

In some embodiments, the process can comprise the steps of:
blending a masterbatch comprising at least one polystyrene and/or modified-polystyrene and carbon nanotubes (CNT), or blending carbon nanotubes with the at least one polystyrene and/or modified-polystyrene to prepare a polystyrene/CNT and/or modified-polystyrene/CNT blend; and
blending at least one polyolefin with the polystyrene/CNT blend and/or modified-polystyrene/CNT blend.

Preferably, the polyolefin forms an immiscible phase in the polystyrene or modified-polystyrene. Preferably, the polystyrene or modified-polystyrene phase comprises the CNT.

In some embodiments, the process can comprise the step of blending a masterbatch comprising polystyrene or modified-polystyrene or a mixture thereof, and carbon nanotubes with a polyolefin and with a polystyrene or modified-polystyrene or a mixture thereof.

In an embodiment, the polystyrene, modified polystyrene or mixture thereof is the major constituent or at least the main continuous or co-continuous polymeric phase. In an embodiment, the polyolefin is the minor constituent in at most a co-continuous or dispersed polymeric phase.

In a preferred embodiment, the composition comprises a modified-polystyrene (PS) such as HIPS and a polyethylene (PE) for example LLDPE. All polymer-polymer or polymer-CNT blends can be made by classical twin-screw extrusion process.

For example, the composition can be prepared by first making a conductive PS by blending powdered CNT or PS-CNT masterbatch with PS. The conductive composition can then be obtained by blending the conductive PS with PE in which the PE phase forms an immiscible phase into the PS. In another example, the conductive composition can be prepared directly by blending PS, PE and PS-CNT masterbatch where conductive PS will be prepared is situ and PE phase forms an immiscible phase into the PS. The same process can be used to prepare conductive composition comprising polystyrene, a polyolefin and CNT, wherein the polyolefin is polypropylene, low density or high density polyethylene, and the like.

The invention also encompasses formed articles comprising the composition according to the first aspect of the invention.

The composition may be suitable for typical injection, extrusion and stretch blow molding applications, but also thermoforming, foaming and rotomolding. The articles made according to these processes can be mono- or multilayer, wherein at least one of the layers comprises the compositions of the invention.

Articles made from the composition may be commonly utilized in material-handling and electronic devices such as packaging film, sheets and thermoformed objects therefrom, chip carriers, computers, printers and photocopier components where electrostatic dissipation or electromagnetic shielding are important requirements. Preferably, the formed article comprises packaging. Preferably, the formed article comprises electronics packaging.

The invention provides new conductive-dissipative compositions and materials therefrom comprising low amounts of CNT, below 1.9% by weight. Preferably, the composition is a blend of at least two immiscible polymers: polystyrene and polyolefin, of which the polystyrene comprises CNT.

Such compositions are economically viable in comparison to usual conductive-dissipative compounds filled with carbon black. The advantage of the present conductive-dissipative composition comprising carbon nanotubes over those comprising carbon black are less alteration of mechanical properties, higher processability, smoother part surface, cleanliness, lower part warpage, less outgasing of volatiles and material downgauging.

The present invention also encompasses a composition comprising at least two immiscible phases: a polystyrene phase comprising polystyrene or modified-polystyrene, or a mixture thereof, and a polyolefin phase comprising a polyolefin, wherein said composition further comprises carbon nanotubes, preferably in the polystyrene phase, in a concentration of at most 1.90% by weight, based on the total weight of the composition.

The present invention can be further illustrated by the following examples, although it will be understood that these examples are included merely for purposes of illustration and are not intended to limit the scope of the invention unless otherwise specifically indicated.

EXAMPLES

Blends according to embodiments of the invention were prepared using a two step process. The blends comprised polystyrene, linear low density polyethylene and carbon nanotubes.

For the carbon nanotubes (CNT), multi-walled carbon nanotubes Nanocyl™ NC 7000, commercially available from Nanocyl, were used. These nanotubes have a surface area of 250-300 $m^2/g$ (measured by BET method), a carbon purity of about 90% by weight (measured by thermal gravimetric analysis), an average diameter of 9.5 nm and an average length of 1.5 μm (as measured by transmission electron microscopy).

For the polystyrene polymer, high impact polystyrene (HIPS) Polystyrene Impact 8350, available from Total Petrochemicals, was used. Polystyrene Impact 8350 has a melt flow index of 4.5 g/10 mn as measured according to ISO 1133 H (200° C.-5 kg) a Rockwell hardness of R 54 (ISO 2039-2), a Density of 1.04 $g/cm^3$ (ISO 1183), a Surface resistivity>$10^{13}$ Ohms as measured according to ISO IEC 93.

For the polyethylene polymer, linear low density polyethylene (LLDPE) Total 1810, available from Total Petrochemicals was used. LL 1810 is an ethylene-butene copolymer produced in a gas phase reactor. LL1810 has a density of 0.919 $g/cm^3$ as measured according to ISO 1183, and a Melt Flow Rate 1.0 g/10 min as measured according to ISO 1133 (190° C./2.16 kg).

In step 1, a high impact polystyrene carbon nanotubes masterbatch (MB-PS-CNT) was prepared by blending using classical twin-screw extrusion process, high impact polystyrene (HIPS) Total 8350 with powdered carbon nanotubes (CNT), such as to obtain a CNT content of about 12.86% by weight based on the total weight of the blend. The masterbatch (MB-PS-CNT) was blended on Brabender co-rotating twin screw extruder with a L/D of 40 (D=20), at a barrel temperature of 190-200-205-205-185° C. (5 heating zone from hopper to die) fixed at 80 RPM, at a throughput of 2 kg/h. The masterbatch was prepared by introduction into the extruder of a dry blend of carbon nanotubes powder and polystyrene.

In step 2, a conductive-dissipative high impact polystyrene (HIPS)-LLDPE-blend was prepared by blending using classical twin-screw extrusion process, high impact polystyrene (HIPS) Total 8350 with linear low density polyethylene (LLDPE) and high impact polystyrene carbon nanotubes masterbatch (MB-PS-CNT) in Brabender co-rotating twin screw extruder using the same extrusion parameters as in step 1. Comparative examples consisted of high impact polystyrene (HIPS) Total 8350 blended with high impact polystyrene carbon nanotubes masterbatch (MB-PS-CNT).

The content of the blends in % by weight are shown in Table 1 (HIPS-LLDPE-CNT compounds, examples 1-5) and Table 2 (HIPS-CNT compounds, comparatives examples 9-12). Comparative examples (9-12) consisted of high impact polystyrene (HIPS) Total 8350 blended with high impact polystyrene carbon nanotubes masterbatch (MB-PS-CNT).

The content of carbon nanotubes in % by weight in blends (% CNT) was determined by thermal gravimetric analysis (TGA) according to ISO 11358 and ASTM E1131, using a Mettler Toledo STAR TGA/DSC 1 apparatus. Prior to the determination of the content of carbon nanotubes in % by weight in blends (% CNT), the carbon content of the carbon nanotubes in % by weight (% C-CNT) was determined: 2 to 3 milligrams of carbon nanotubes were placed into a TGA. The material was heated at a rate of 20° C./min from 30° C. to 600° C. in nitrogen (100 ml/min). At 600° C., the gas was switched to air (100 ml/min), and the carbon oxidized, yielding the carbon content of the carbon nanotubes in % by weight (% C-CNT). The % C-CNT value was the average of 3 measurements. For the content of carbon nanotubes % by weight in blends (% CNT), 10 to 20 milligrams of sample was placed into a TGA. The material was heated at a rate of 20° C./min from 30° C. to 600° C. in nitrogen (100 ml/min). At 600° C., the gas was switched to air (100 ml/min), and the carbon oxidized, yielding to the carbon content of carbon nanotubes in the sample (% C-sample). The % C-sample value was the average of 3 measurements. The content of carbon nanotubes % by weight in sample (% CNT) was then determined by dividing the carbon content of carbon nanotubes % by weight in samples (% C-sample) by the carbon content of the carbon nanotubes in % by weight (% C-CNT) and multiplying by 100.

% CNT=% C-sample/% C-CNT*100

The surface resistivity (SR) of the blend was measured using a 2410 SourceMeter® apparatus. Conditions which were used were similar to those described in the CEI 60167 and NF C26-215 test methods. The surface resistivity (SR) was measured on 2 mm thick compression molded plaque at 200° C. during 12 minutes. The resistance measurement was performed using an electrode system made of two conductive paint lines using silver ink and an adhesive mask presenting 2 parallel slits 25 mm long, 1 mm wide and 2 mm apart. The samples were conditioned at 23° C./50% RH for minimum 4 hours before running the test. The measure of the resistance in ohm was reported to a square measurement area and expressed in ohm/square using the following equation: SR=(R×L)/d, wherein: SR is the average resistance reported to a square measurement area, conventionally called surface resistivity (expressed in ohm/sq), R is the average of the resistance measurements (ohm), L is the paint line length (cm), d is the distance between the electrodes (cm). L=2.5 cm and d=0.2 cm and SR=R×12.5. The surface resistivity (SR) value was the average of 3 measurements.

The results of the measurement are shown in Table 1 and Table 2.

TABLE 1 examples

| | Blends | | | | |
|---|---|---|---|---|---|
| | 1 | 2 | 3 | 4 | 5 |
| % HIPS | 83.79 | 64.01 | 59.17 | 54.21 | 59.31 |
| % LLDPE | 15 | 35 | 40 | 45 | 40 |
| % CNT | 1.21 | 0.99 | 0.83 | 0.79 | 0.69 |
| SR (ohm/sq) | $5\,10^3$ | $6\,10^3$ | $4\,10^3$ | $5\,10^3$ | $9\,10^3$ |

TABLE 2 comparative examples

| | Blends | | | |
|---|---|---|---|---|
| | 9 | 10 | 11 | 12 |
| % HIPS | 98.59 | 98.45 | 98.18 | 97.94 |
| % CNT | 1.41 | 1.55 | 1.82 | 2.06 |
| SR (ohm/sq) | $1\,10^6$ | $4\,10^4$ | $3\,10^4$ | $8\,10^3$ |

The blends according to the invention had a good surface resistivity even at low concentration in CNT.

The invention claimed is:

1. A composition comprising:
polystyrene, rubber modified-polystyrene, or a mixture thereof, said polystyrene, modified-polystyrene, or mixture thereof further comprising carbon nanotubes; and
a polyolefin;
wherein the composition comprises at least 0.65% by weight and at most 1.90% by weight of carbon nanotubes, based on a total weight of the composition, and wherein the rubber modified-polystyrene contains rubber in an amount ranging from 3 to 15 weight percent based on a total weight of the rubber modified-polystyrene.

2. The composition according to claim 1, wherein the composition comprises at least 30% by weight of the polystyrene, the rubber modified-polystyrene, or the mixture thereof, based on the total weight of the composition.

3. The composition according to claim 2, wherein the composition comprises at least 50% by weight of the polystyrene, the rubber modified-polystyrene, or the mixture thereof, based on the total weight of the composition.

4. The composition according to claim 1, wherein the composition has a surface resistivity of at most $10^4$ Ohm/sq.

5. The composition according to claim 1, wherein the composition comprises at least 0.68% by weight of carbon nanotubes relative to the total weight of the composition.

6. The composition according to claim 1, wherein the composition comprises at most 1.75% by weight of carbon nanotubes relative to the total weight of the composition.

7. The composition according to claim 1, wherein the composition is free of any compatibilizer.

8. The composition according to claim 1, wherein the composition comprises a polystyrene phase and a polyolefin phase;
wherein the polystyrene phase comprises the polystyrene, the rubber modified-polystyrene, or the mixture thereof;
wherein the polyolefin phase comprises the polyolefin; and
wherein the polystyrene phase comprises at least 50% by weight of carbon nanotubes, based on a total weight of the carbon nanotubes in the composition.

9. The composition according to claim 1, wherein the composition comprises the rubber modified-polystyrene or the mixture of the rubber modified-polystyrene and the polystyrene.

10. The composition according to claim 1, wherein the polyolefin is polyethylene, polypropylene, or a combination thereof.

11. The composition according to claim 1, wherein the polyolefin is polyethylene.

12. The composition according to claim 1, wherein the composition comprises at least 15% by weight of the polyolefin, based on the total weight of the composition.

13. A process for preparing a composition comprising:
(a) providing a masterbatch blend comprising a polystyrene, a modified-polystyrene, or a mixture thereof, and carbon nanotubes; and
(b) melt blending the masterbatch blend with a polystyrene, a modified-polystyrene, or a mixture thereof and with a polyolefin;
wherein the composition comprises at most 1.90% by weight of carbon nanotubes, based on a total weight of the composition.

14. The process according to claim 13, wherein the masterbatch blend comprises at least 5% by weight of carbon nanotubes based on the total weight of the masterbatch blend.

15. The process according to claim 13, wherein the masterbatch blend, the polyolefin, and the polystyrene, the modified-polystyrene, or the mixture thereof are blended in step (b) in amounts such that the composition comprises at least 30% by weight of the polystyrene, the modified-polystyrene, or the mixture thereof based on the total weight of the composition.

16. The process according to claim 13, wherein the masterbatch blend, the polyolefin, and the polystyrene, the modified-polystyrene, or the mixture thereof are blended in step (b) in amounts such that the composition comprises at least 50% by weight of the polystyrene, the modified-polystyrene, or the mixture thereof based on the total weight of the composition.

17. The process according to claim 13, wherein the masterbatch blend, the polyolefin, and the polystyrene, the modified-polystyrene, or the mixture thereof are blended in step (b) in amounts such that the composition comprises at most 1.90% by weight of carbon nanotubes, and at least 0.3% by weight of carbon nanotubes based on the total weight of the composition.

18. The process according to claim 13, wherein the masterbatch blend, the polyolefin, and the polystyrene, the modified-polystyrene, or the mixture thereof are blended in step (b) in amounts such that the composition comprises at most 1.90% by weight of carbon nanotubes, and at least 0.5% by weight of carbon nanotubes based on the total weight of the composition.

19. An article made of the composition according to claim 1.

20. The process according to claim 13, wherein the modified-polystyrene is a rubber modified-polystyrene containing rubber in an amount ranging from 3 to 15 weight percent based on a total weight of the rubber modified-polystyrene, and wherein the composition comprises at least 0.65% by weight and at most 1.90% by weight of carbon nanotubes, based on the total weight of the composition.

21. The composition according to claim 1, wherein the composition is free of any compatibilizer, and wherein the composition comprises a polystyrene phase and a polyolefin phase;
    wherein the polystyrene phase comprises the polystyrene, the rubber modified-polystyrene, or the mixture thereof;
    wherein the polyolefin phase comprises the polyolefin; and
    wherein the polystyrene phase comprises at least 50% by weight of carbon nanotubes, based on a total weight of the carbon nanotubes in the composition.

22. The composition according to claim 1, wherein the composition comprises a polystyrene phase and a polyolefin phase;
    wherein the polystyrene phase comprises the rubber modified-polystyrene or the mixture of the rubber modified-polystyrene and the polystyrene;
    wherein the polyolefin phase comprises the polyolefin; and
    wherein the polystyrene phase comprises at least 50% by weight of carbon nanotubes, based on a total weight of the carbon nanotubes in the composition.

23. The composition according to claim 1, wherein the polyolefin is polyethylene, and wherein the composition is free of any compatibilizer.

24. The composition according to claim 1, wherein the polyolefin is polyethylene, and wherein the composition comprises the rubber modified-polystyrene or the mixture of the rubber modified-polystyrene and the polystyrene.

* * * * *